(12) United States Patent
Kritzler

(10) Patent No.: US 10,771,350 B2
(45) Date of Patent: Sep. 8, 2020

(54) METHOD AND APPARATUS FOR CHANGEABLE CONFIGURATION OF OBJECTS USING A MIXED REALITY APPROACH WITH AUGMENTED REALITY

(71) Applicant: Siemens Aktiengesellschaft, Munich (DE)

(72) Inventor: Mareike Kritzler, San Francisco, CA (US)

(73) Assignee: Siemens Aktiengesellschaft, Munich (DE)

( * ) Notice: Subject to any disclaimer, the term of this patent is extended or adjusted under 35 U.S.C. 154(b) by 339 days.

(21) Appl. No.: 15/715,509

(22) Filed: Sep. 26, 2017

(65) Prior Publication Data

US 2019/0097896 A1 Mar. 28, 2019

(51) Int. Cl.
| | | |
|---|---|---|
| *H04L 12/24* | (2006.01) | |
| *G06T 19/20* | (2011.01) | |
| *G02B 27/01* | (2006.01) | |
| *G06F 3/01* | (2006.01) | |
| *G06K 9/00* | (2006.01) | |
| *G06T 19/00* | (2011.01) | |
| *G06F 3/0481* | (2013.01) | |
| *G06F 3/0482* | (2013.01) | |

(52) U.S. Cl.
CPC ............ *H04L 41/22* (2013.01); *G02B 27/017* (2013.01); *G06F 3/011* (2013.01); *G06F 3/012* (2013.01); *G06F 3/014* (2013.01); *G06F 3/0482* (2013.01); *G06F 3/04815* (2013.01); *G06K 9/00671* (2013.01); *G06T 19/006* (2013.01); *G06T 19/20* (2013.01); *G02B 2027/014* (2013.01); *G02B 2027/0138* (2013.01); *G02B 2027/0187* (2013.01)

(58) Field of Classification Search
None
See application file for complete search history.

(56) References Cited

U.S. PATENT DOCUMENTS

| | | | | |
|---|---|---|---|---|
| 2012/0249588 | A1* | 10/2012 | Tison | G06F 1/1696 345/633 |
| 2013/0031202 | A1* | 1/2013 | Mick | G06Q 10/06 709/217 |
| 2013/0282345 | A1* | 10/2013 | McCulloch | G06T 19/006 703/6 |

(Continued)

*Primary Examiner* — Cedric Johnson

(57) ABSTRACT

A system for enabling an augmented reality application includes in a mobile device of a user, displaying a real-world object and allowing the user to interact with the real-world object by drawing a virtual outline of the object and build up the current configuration or its virtual twin. A computer processor retrieves a list of possible component objects of the real-world object. The user interacts with a visual depiction of the scene and move candidate component objects to the virtual outline of the real-world object. The configuration of the real-world object is saved allowing the AR application to retrieve the verified configuration and produce augmented overlays overtop the visual depiction of the real-world object. The configuration is verified by the user using spatial relationships of the component objects associated with the real-world object. The verified object configuration may be tracked in the AR application without needing a recognition procedure.

16 Claims, 6 Drawing Sheets

(56) References Cited

U.S. PATENT DOCUMENTS

2014/0282162 A1\* 9/2014 Fein ........................ G06F 3/013
                                                                            715/769
2016/0071319 A1\* 3/2016 Fallon ................... G06T 19/006
                                                                            345/633

\* cited by examiner

METHOD AND APPARATUS FOR CHANGEABLE CONFIGURATION OF OBJECTS USING A MIXED REALITY APPROACH WITH AUGMENTED REALITY

TECHNICAL FIELD

This application relates to configuration of real-world objects that consists of multiple components. More particularly, this application relates to augmented reality applications interacting with real-world objects.

BACKGROUND

Augmented reality (AR) is a technology that superimposes digital information on top of real-world objects. AR applications run on mobile devices, which are equipped with at least one camera and a display. These devices may include tablet computers, head-mounted and other wearable devices, and the like. AR applications track real-world objects in order to align or display digital information alongside or overlaying the objects. Tracking requires an AR application to be capable of identifying an object to be augmented in the camera view. Accordingly, prior knowledge about the object is necessary for it to be recognized. Through preprocessing (e.g. recording of point clouds of real-world objects or manipulation of 3D computer aided drafting (CAD) files), vision algorithms can recognize real-world objects. Tracking and correct alignment might not work properly if the configuration of an object at the time the AR application is in use deviates from the configuration of the same object present during pre-processing.

Mixed Reality (MR) is a technology similar to AR. MR displays digital information in the field of view of a user, mostly using head-mounted devices, such as MICROSOFT HOLOLENS or META 2 devices. In contrast to AR, MR does not track a specific object, but instead tracks the user's environment. MR allows a user to place digital objects at any 3D position in any given real-world room. The 3D position is then fixed in the virtual 3D space. Augmented reality applications require pre-processing in order to superimpose digital information on top of real-world objects. If the configuration of an object that is intended to be tracked changes by the time an AR application attempts tracking, the object might not be recognized. This results in the corresponding digital information not being displayed correctly. Solutions are needed for adapting AR applications to changing configuration objects (e.g., cabinets or computer racks) during runtime using mixed reality (MR) approaches.

SUMMARY

A system for enabling an augmented reality (AR) application includes a computer processor; a mobile device in communication with the computer processor; an environment sensing device in communication with the mobile device, and a memory in communication with the computer processor. The memory stores instructions executable on a computer processor and cause the computer processor to receive an input from a user indicative of a spatial property of a real-world object, track the real-world object with the AR application based on the user input, and display a visual overlay on an object in the user's field of view sensed by the environment sensing device containing the real-world object. The mobile device may be a device wearable by the user. Alternatively, the mobile device may be a tablet computer.

In an embodiment, the input received from the user comprises the user tracing a virtual outline of the real-world object. The input received from the user may include the user selecting a type of real-world object from a list containing a plurality of types of real-world objects. In an embodiment, the real-world object may be a computer rack and a first configuration of the computer rack is a placement of a plurality of computer components in the computer rack in a first specific order. A second configuration of the computer rack may relate to placement of a second plurality of computer components in the computer rack in a second specific order different than the first specific order.

Displaying a visual/digital overlay may include displaying in the mobile device, (animated) step by step procedures, e.g. maintenance, on one computer component of the first configuration or the second configuration of the computer rack.

According to embodiments, the real-world object may include an inventoried component within a room, and the first configuration is a spatial position of the inventoried component within the room. The visual overlay may include displaying in the mobile device, stored information relating to the inventoried object.

According to a method for displaying information in an augmented reality (AR) application includes, in a computer processor, receiving an input from a user relating to a spatial coordinate within a field of view of the user, the user input relating to a first configuration of a real-world object. In the AR application, associating the user input with the real-world object and superimposing in a viewable mobile device, augmented reality data over a depiction of the real-world object. The mobile device may be a device wearable by the user or the mobile device may be a tablet computer, by way of example.

The input received from the user comprises the user tracing a virtual outline of the real-world object. Further, the input received from the user may comprise the user selecting a type of real-world object from list containing a plurality of types of real-world objects. According to an embodiment the real-world object may be a computer rack where a first configuration of the computer rack is a placement of a plurality of computer components in the computer rack in a first specific order. Moreover, a second configuration of the computer rack is placement of a second plurality of computer components in the computer rack in a second specific order different than the first specific order. Displaying a visual overlay may include displaying in the mobile device, an animated maintenance procedure on one computer component of the first configuration or the second configuration of the computer rack. According to another embodiment, the real-world object may be an inventoried component within a room, and the first configuration is a spatial position of the inventoried component within the room and displaying a visual overlay may include displaying in the mobile device, stored information relating to the inventoried object.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
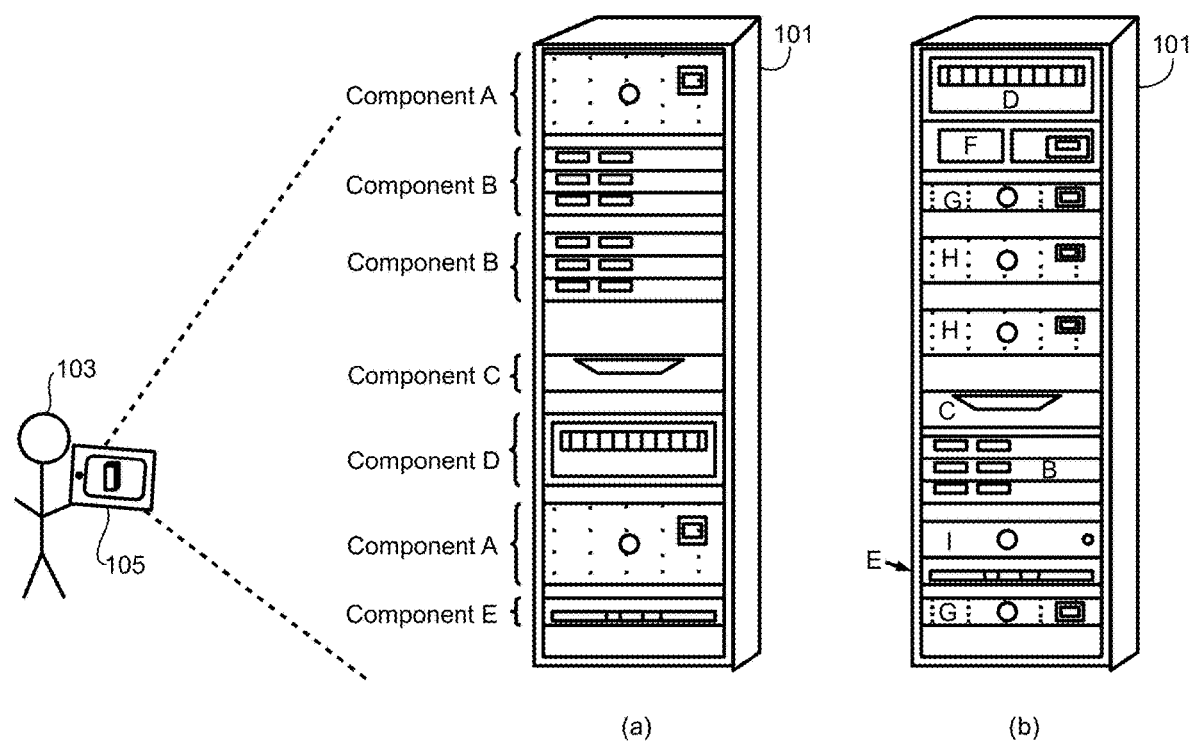
FIG. 1 is an illustration showing a change in configuration of an object according to aspects of embodiments of the disclosure.

Augmented reality (AR) is a technology that superimposes digital information on top of real-world objects. AR applications run on mobile devices. Available mobile devices generally include at least one camera and a display. For example, computer tablets or head-mounted devices may be used with AR applications. AR applications track real-world objects in order to align or display digital information alongside or on top of the real-world objects. Tracking requires the AR application to recognize the real-world object, which is to be augmented, in the camera view. In other words, in an example using a tablet computer, the tablet's camera is directed toward a real-world scene, the digital camera associated with the tablet computer perceives a digital representation of the camera's field of view. An AR application running on or in communication with the tablet computer, receives the captured or streamed image or representation and analyzes the digital information in the representation to discern and identify real-world objects captured in the digital image or representation. To recognize real-world objects, the AR application must have some prior knowledge about the real-world object. Pre-processing involves the recording of point clouds or manipulation of 3D computer aided design (CAD) files associated with a given real-world object. Vision algorithms may take the processed information relating to the real-world object and be applied to a sensed environment or state representation to identify a real-world object contained in the image/scene.

It is possible that during the use of an AR application, the configuration or spatial relation of a real-world object may change. When this happens, the sensed environment or representation of the object may no longer match the pre-processed information relating to the object. As a result, the mismatch between the pre-processed information and the changed configuration of the object may cause the vision algorithms to not perform adequately and the algorithms may not reliably recognize the object. In some embodiments, the real-world object may include several varying components. Between instances of the real-world different configurations exist based on the various components being arranged in different orders.

Mixed reality (MR) is a technology which addresses situations similar to those applicable to AR. In MR, digital information is displayed within a field of view of a user, typically using a head-mounted device or similar interface. Examples of head-mounted devices suitable for use with MR technologies include, but are not limited to, MICROSOFT's HOLOLENS or METAVISION's META 2 head-mounted devices. In contrast to AR, MR does not track specific objects within the field of view, but instead maps and tracks the user's environment. Thus, it is a spatial representation of the entire user's field of view that is used in MR, as opposed to separating components located in the field and performing recognition procedures to identify the components. Thus, using MR, digital objects may be placed at any 3D position within a real-world room. The 3D position is then fixed within the 3D virtual 3D space.

According to aspects of an embodiment described in this application, the order of components arranged within a larger object defines a configuration of the object and may include multiple objects. For example, consider a switch cabinet or computer rack (or a room with sensors/actuator/technical equipment). Multiple components may be arranged within a first cabinet or rack. However, a second cabinet rack may include more or fewer components, including additional components compared to the first cabinet or rack. Furthermore, the components contained in the second cabinet or rack may be arranged in a different order with respect to one another.

FIG. 1 illustrates this concept with respect to a computer rack 101. A user 103 may operate a mobile device 105, such as a tablet computer. The mobile device 105 includes a camera or other imaging device, which may be directed toward the computer rack 101 to sense a digital image or representation of the computer rack 101. At a given point in time, user 103 may view an image or perceived view of computer rack 101 in a first view denoted (a), or may have viewed, computer rack 101 in a second, different configuration denoted (b). Alternatively, user 103 may view a different computer rack (not shown) that has a similar geometry to computer rack 101, but contains different component objects, or component objects in a different order. As may been seen in configuration (a), from top to bottom, computer rack 101 contains a component A, a first component B, a second component B, component C, component D, a second component A, and a component E. Thus, in configuration (a) computer rack 101 contain 7 objects of 5 different types (Components A-E). When viewing computer rack 101 in configuration (b), it may be noted that computer rack 101 when in configuration (b), includes ten objects of 8 different types (Components B-I). From top to bottom, computer rack 101 in configuration (b) includes a component D, a component F, a component G, a first component H, a second component H, a component C, a component B, a component I, a component E, and a second component G. Accordingly, configuration (b) contains more objects than configuration (a). With regard to types of objects, configuration (b) does not contain a component A as seen in configuration (a), but further includes components F, G H, and I, that are not found in configuration (a).

As discussed above, an AR application that was pre-processed or trained to recognize computer rack 101 in configuration (a), would not be able to recognize the computer rack 101 when it is in configuration (b), due to the elimination, addition and rearrangement of the objects contained in the computer rack 101.

According to aspects of embodiments of the present invention, properties of MR are used to configure AR applications used to augment objects. In particular, objects that are comprised of multiple, different objects may be augmented regardless of changes in the configuration of the objects. As described in greater detail below, a user (e.g., a service technician) employs an MR device to prepare the augmentation of objects within an AR application. The user may build a customized virtual overlay for real-world objects at run time using spatial properties of the user's environment. In this way, the system may adapt to changing configurations. The described systems may be used for servicing, maintaining, managing inventory or repairing technical equipment, by way of non-limiting example.

Certain aspects of embodiments of the present invention will now be described with respect to the configuration and augmentation of a computer rack containing a number of disparate components. It should be understood that embodiments of the present invention are not limited to this application, and other applications may be contemplated which may benefit from the described systems and methods. Such other applications fall within the intended scope of this disclosure. The present invention is further not limited to any hardware, software of combination thereof for the implementation of the described embodiments. For example, a mobile device for interacting with the environment of the user may be implemented using a head-mounted device. However, the described embodiments are not so limited. Other devices or interfaces may be contemplated that perform similar functions with respect to the described systems and methods. Thus, this disclosure should be read in a broad sense to include any hardware or software combinations that perform the described improvements, including devices presently existing as well as comparable devices developed in the future.

Figure 2:
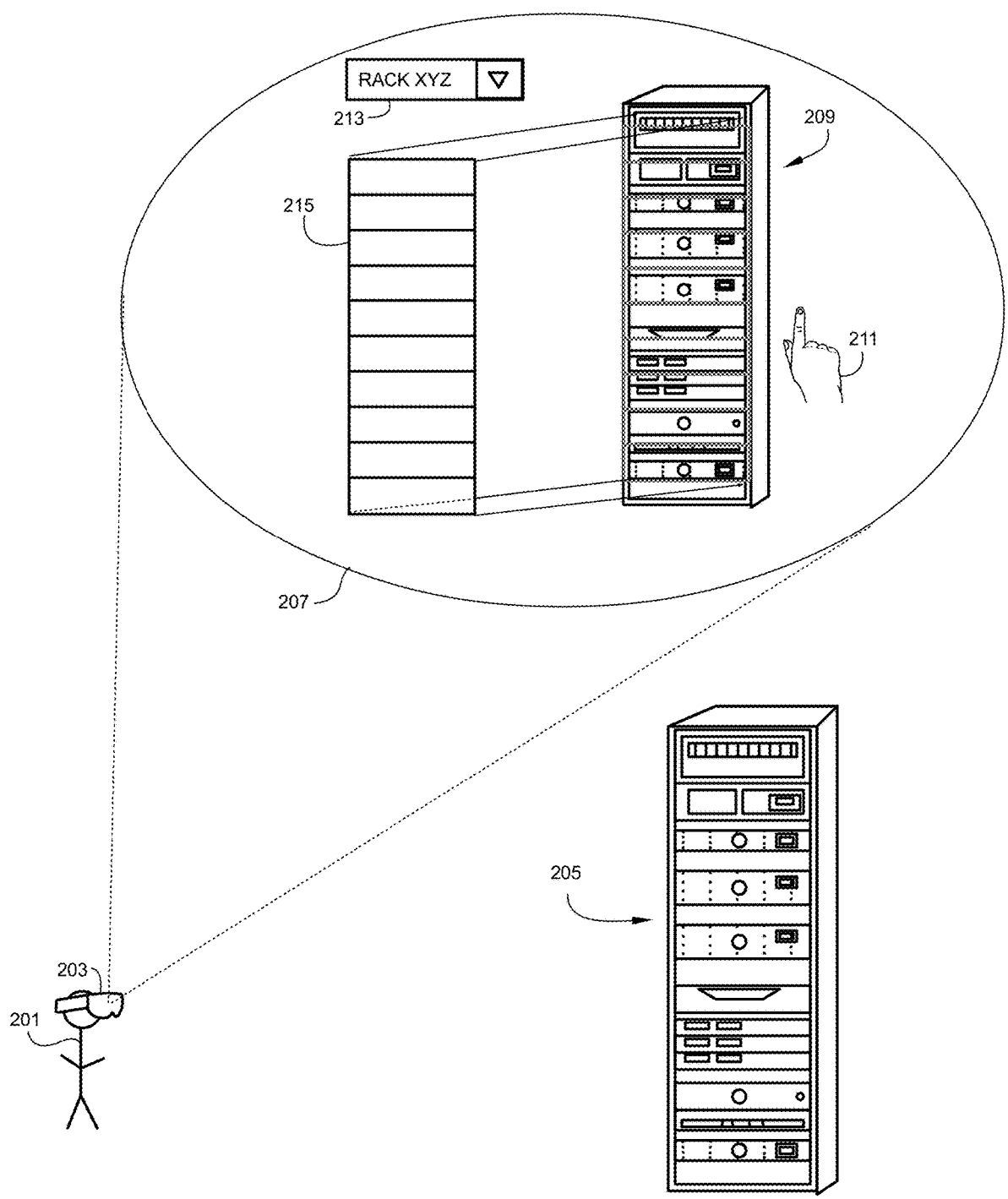
FIG. 2 is an illustration showing the implementation of a virtual grid for spatially identifying objects according to aspects of embodiments of this disclosure.

FIG. 2 is an illustration of a user specifying a virtual overlay of a real-world object according to aspects of embodiments of the present disclosure. A user 201 is equipped with a mobile device 203 for performing a task related to MR and AR processing. According to an embodiment, mobile device 203 may be a head-mounted device. User 201 is in a 3D space (e.g. a room) containing a real-world object 205. By way of example, real-world object 205 may be a computer rack housing a number of varying computer-related components. Mobile device 203 provides user 201 with a representative view 207 of the 3D space 207. The representative view 207 includes a depiction 209 of real-world object 205. Depiction 209 is representative of what user 201 views through mobile device 203. Depiction 209 includes objects in view of the user, as well as any additional information in overlays or audio outputs provided by the AR application. Depiction 209 may display a capture or stream of environment captures sensed by the mobile device, such as a tablet computer, or may be a real-time view of the user's surroundings in the case of a mobile device embodied as a wearable device.

The representative view 207 provides an interface between a computer processor and the user 201. Thus, the display of objects within the representative view 207 may be controlled by a computer processor within mobile device 203 or otherwise in communication with mobile device 203. Accordingly, an AR and/or MR application running on a computer processor may be in communication with the representative view 207. In this manner, the representative view, in combination with interaction by the user 201, serves as an input device to the computer processor and may further serve as an output device for data processed and provided by the computer processor.

A cursor 211 may be provided in the representative view 207 for display to a user 201. The cursor 211 may be responsive to inputs provided by the user 201. Cursor 211 may also be embodied by hand gestures or a gaze for user 201 that is recognizable by mobile device 203. Cursor 211 provides control of the AR application through a natural interaction between the user 201 and the AR mobile device 203. For example, mobile device 203 may include sensors that sense and interpret a view of the user's environment that may include the hand of the user 201. As user 201 moves her hand with the 3D space, cursor 211 may be shown to move within representative view 207. The location of cursor 211 within the 3D space representative view 207, may be provided to the computer processor as input information relating to a user's 201 interaction with real-world object 205 via the object's depiction 209 in the representative view 207. The computer processor may receive input information from the user 201 via cursor 211, and may process the input information to provide output information that may be communicated to the mobile device 203. Mobile device 203 may receive the output information from the computer processor and represent the output information in the representative view 207.

For example, mobile device 201 may render lines or overlays which are visible to the user 201 over or next to depiction 209 of real-world object 205. In an embodiment, the user 201 may draw lines within the field of view of the mobile device 203 to provide helper lines or grids to assist the AR application in identifying spatial regions of the field of view. Other items may be displayed in representative view 207. For example, a drop-down list 213 may be provided and displayed to user 201. Drop-down list 213 may be accessed by the user 201 via cursor 211. The user 201 may point to the drop-down list 213 and select an entry from the list. For example, as shown in FIG. 2, drop-down list 213 may be selected to display a label "RACKXYZ" which may be descriptive of the real-world object 205. Thus, the user 201 may identify the general properties of the real-world object 205 and provide that information to the computer system by way of the drop-down list 213.

The user 201 may align a virtual outline 215 which overlays the visual depiction 209 of real-world object 205. The virtual outline 215 may be pre-configured based on previously known properties of the object. In other embodiments, the user 201 may interact with mobile device 203, manipulating cursor 211 using the user's 201 hand or gaze. The user 201 may trace with a finger, the outline of the visual depiction 209 of the real-world object 205. The customized virtual outline 215 when created by the user 201 by tracing an outline of visual depiction 209, may be associated with an object that is stored in drop-down list 213. Once stored in the drop-down list 213, the virtual outline 215 may be recalled in the future by a user 201 selecting the stored object from the drop-down list 213. When selected, the custom virtual outline 215 will be recalled and displayed to the user 201.

Figure 3:
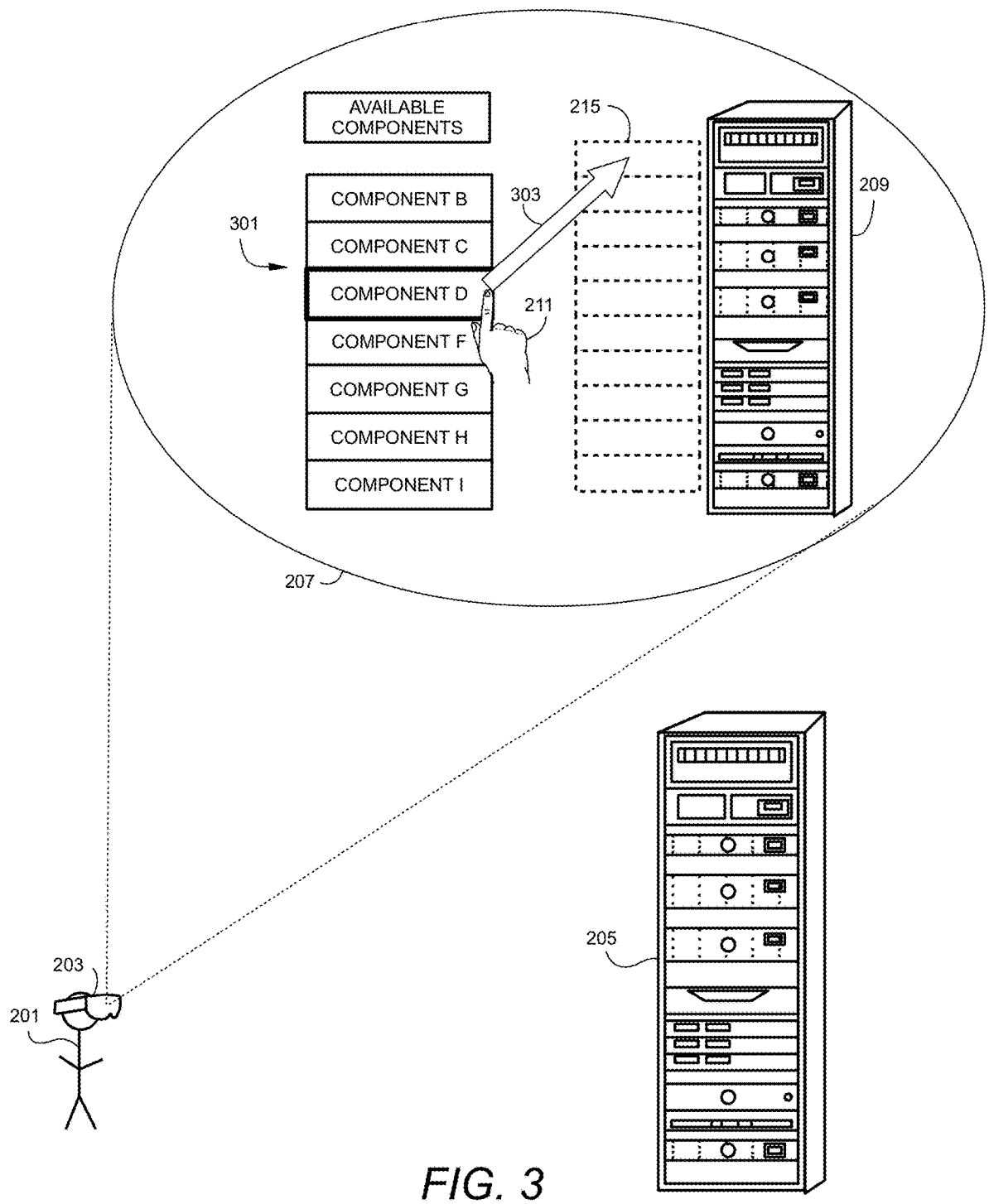
FIG. 3 is an illustration of the allocation of system objects to the virtual grid shown in FIG. 2 according to aspects of embodiments of the disclosure.

Referring now to FIG. 3, the representative view 207 seen by user 201 is updated to display a list of possible component objects 301. The list of possible component objects 301 contains representations of component objects that may be associated with the real-world object 205. Using the list of possible component objects 301, the user 201 builds a desired configuration for a specific real-world object 205. The interface displayed in the representative view 207 displays all the components available to real-world object 205 in a panel corresponding to the list of possible component objects 301. The user 201 may manipulate the cursor 211 to drag and drop 303 a component in the list 301 to one or more positions within the virtual outline 215. User 201 may repeatedly select component objects from the list 301 and drag them to corresponding positions in the virtual outline 215 until the depiction 209 of the real-world object 205 corresponds with the virtual outline 215 overlaying the depiction 209 to provide an accurate overall digital representation of the real-world object 205 in the user's 201 view.

Once the virtual outline 215 has been fully populated with component objects, the specific configuration may be saved for future use. For example, a service technician returning to a location to maintain a rack which has already be configured, may recall the previously saved configuration and continue with the maintenance tasks based on the prior identified configuration or can use the saved configuration as a starting point and reconfigure if something in the real world changed. Allowing a user 201 to manually align the virtual components in the virtual outline 215 according to the real-world component objects ensures that the correct information and instructions for a specific component object may be displayed in an AR application.

After the arrangement of components within an object is complete, the virtual overlay, comprising the virtual outline 215 and the components selected from the possible component objects 301, portions of the virtual overlay may act as buttons which initiate actions within the AR or MR application. These buttons can give access to digital information connected to the object.

Figure 4:
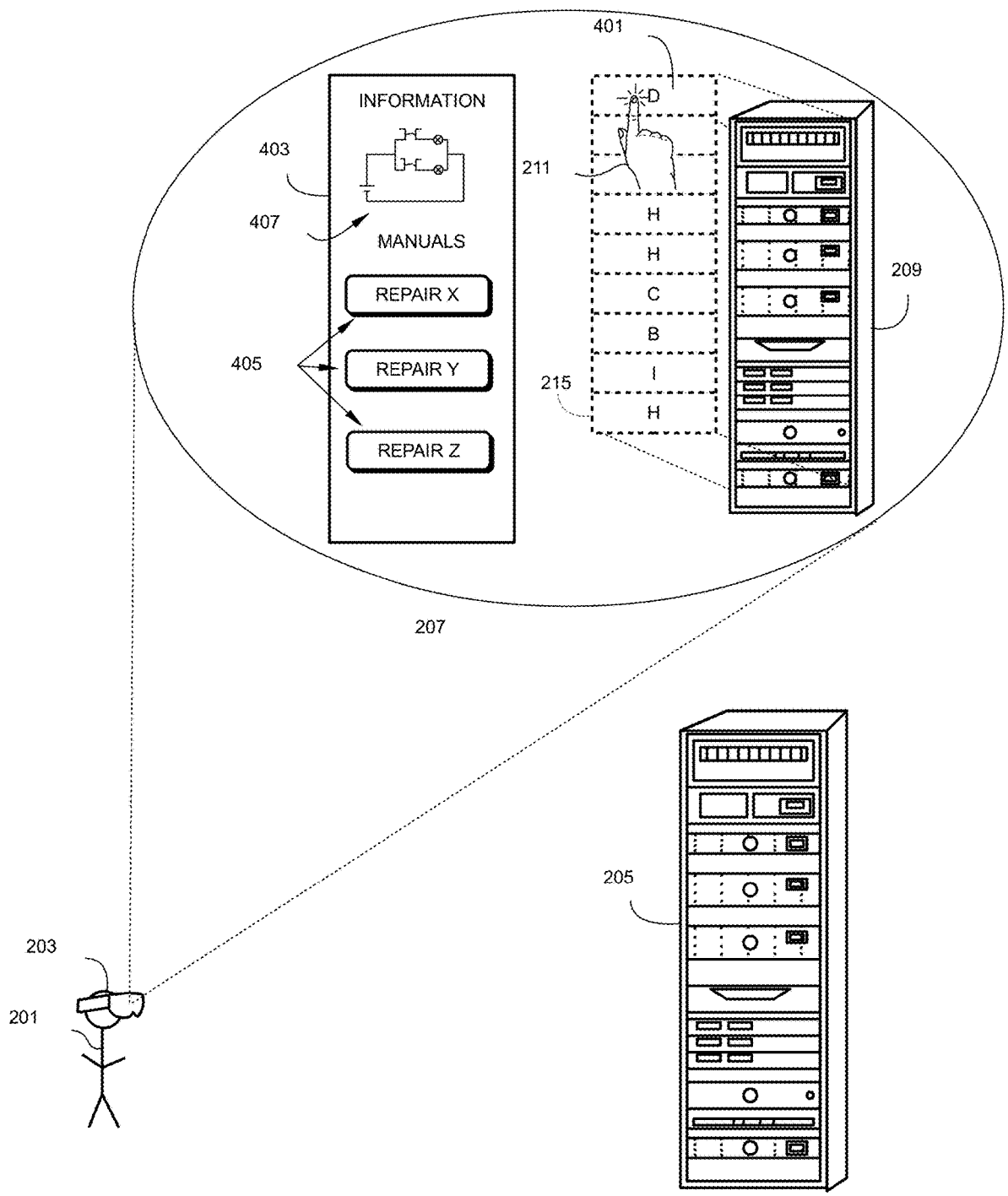
FIG. 4 is an illustration of the displaying of pre-authored information or experience regarding an object selected by a user according to aspects of embodiments of the disclosure.

FIG. 4 is an illustration of a virtual overlay acting as an action button in an AR application according to aspects of an embodiment of the disclosure. As shown in FIG. 4, a user 201 views the representative view 207 of a real-world object 205 via a mobile device 203, such as a head-mounted display. Using her hand or gaze, user 201 points to a virtual depiction of an object 401 contained within the virtual outline 215 of the virtual overlay placed over the visual depiction 209 of the real-world object 205. User 201 provides a click action with cursor 211 on virtual object 401. The click provides a signal to a computer application operating in communication with mobile device 203. The signal includes the position of the cursor 211 when the click was performed, as well as a command to the computer application to execute a particular set of computer instructions. For example, when user 201 clicks on the virtual object 401 corresponding to a component object "D", the computer program may be adapted to generate or lookup from memory technical information relating to the virtual object "D" 401 selected by the user 201. Additional information may be displayed in an overlay panel 403.

Technical information relating to virtual object "D" displayed in overlay panel 403 may include a schematic drawing 407, where component object "D" 401 is an electronic component. In addition to a visual depiction of technical information, further actions available to user 201 may be displayed. For example, one or more buttons 405 may be provided to allow the user 201 to select one of the buttons and perform additional actions. For example, buttons 405 may relate to a number of different maintenance or repair actions. If a user selects a button 405 labeled "Repair Y", an AR scene may be displayed to user 201 in mobile device 203. In response to selecting the button, the AR scene may animate a selected repair action, and display the steps of the repair to a user 201.

Figure 5:
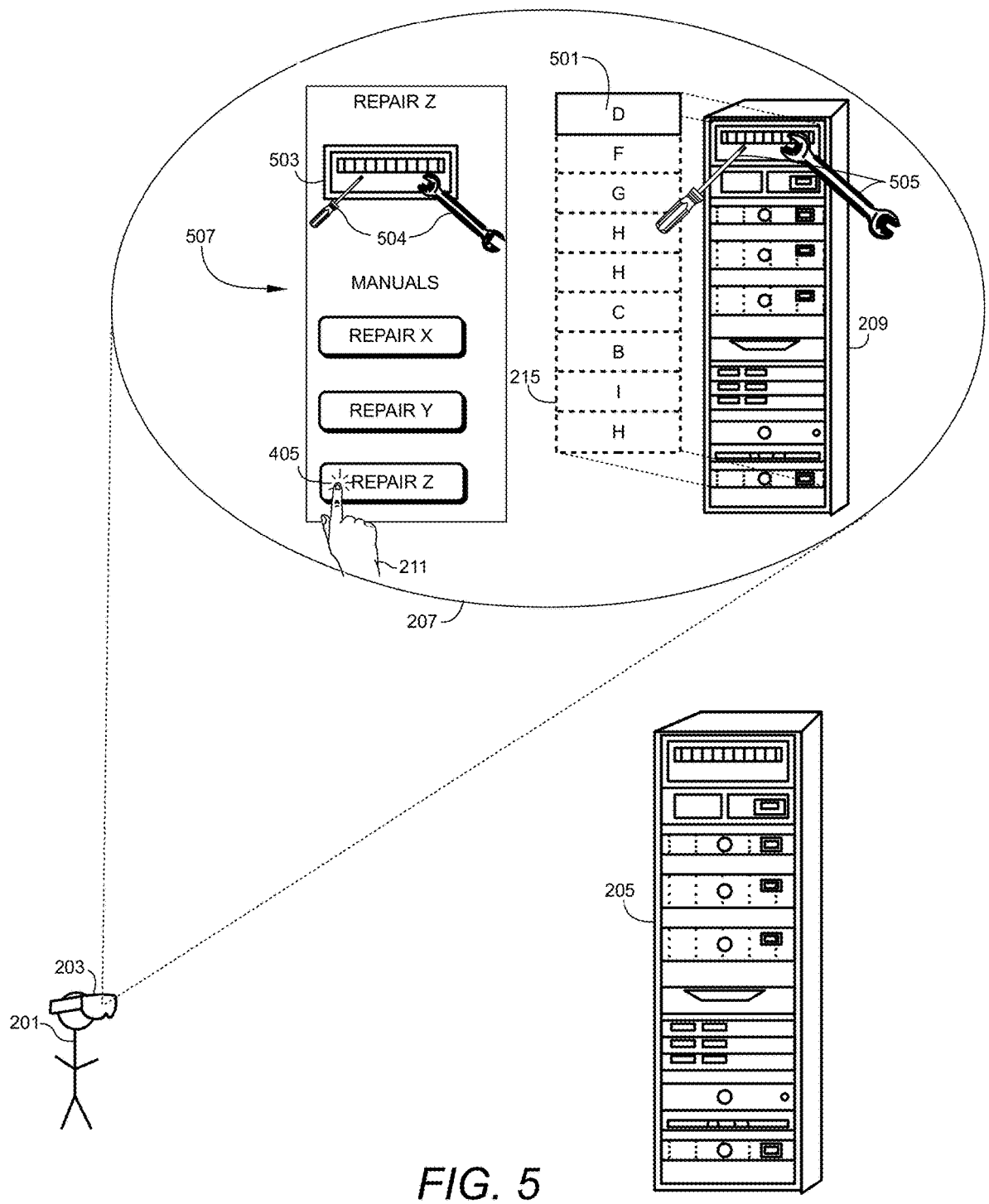
FIG. 5 is an illustration of an AR application interacting with an object selected by a user according to aspects of embodiments of the disclosure.

FIG. 5 is an illustration of an augmented reality repair procedure according to aspects of embodiments of the disclosure. As seen in FIG. 5, information displayed to the user need not be only static information about a component object 501. A user 201 selects a component object 501 by clicking on the virtual outline 215. Upon selection of a component object 501, mobile device 203 displays an informational overlay 507 within the visual representation 207 of the real-world object 205. The informational overlay 507 includes a visual depiction 503 of the selected component object 501. Further, informational overlay 507 may include buttons 405. User 201 selects a button 405 by clicking on the button 405 with cursor 211. With reference to FIG. 5, user 201 selects button 405 labeled "Repair Z". Upon clicking button 405, mobile device 203 receives an input command identifying button 405 corresponding to Repair Z. Mobile device 203 issues a command to a computer processor, either within the mobile device 203 or to a different computer processor that is in communication with mobile device 203. The command initiates the execution of computer instructions that perform an action presenting visual information to the user. In one example, the visual information includes augmented reality experiences that relate to tasks which may be performed on component object 501. For a particular maintenance operation, the user 201 may be presented with a visual depiction of the component object 503. Virtual tools 504 may be displayed relative to the visual depiction of the component object 503.

In addition, or alternative to visual depiction 503 in overlay 507, virtual tools 505 may be displayed over virtual outline 215 and visual depiction 209 of real-world object 205. Virtual tools 505 provide a virtual step-by-step illustration or instructions for a particular task relating to a specific component. A user 201 is thus able to see the digital or virtual instructions for performing the maintenance procedure on the actual real-world object 205.

While the foregoing embodiments involve enhanced AR capabilities with regard to a computer rack configuration, the invention is not so limited. Other uses may be contemplated by those of skill in the art. For instance, in another non-limiting example, an inventory of parts operating or stored within a given space may be augmented via an AR application. According to an embodiment, a user enters a room containing a number of reconfigurable component objects. A computer processor in communication with a mobile device operated by a user, receives an input from the user, for example, the user may provide inputs relating to the configurable objects in the space. In one example, the user may establish an inventory of configurable objects in the space. Based on the location of the user, the computer processor may provide the user, via a viewable mobile device, a list of objects that are identified as having been delivered to the location. The user may see the list of objects overlaid on a view of the real-world object of the location viewable by an environment sensing device (e.g., a depth camera) in communication with the mobile device. The user may provide an input by selecting objects from the delivered object list and dragging the object to a spatial location represented in the sensed environment. Each delivered object may be dragged to its respective spatial position within the room to form an overall inventory of the space. The inventoried space may then be saved as a configuration to be recalled at a later time.

In another usage, a technician may enter a location that he or she is unfamiliar with. In this case, the user may use a mobile device, for example a head-mounted device, which provides the user a view of the location using a sensed field of view. A computer processor in communication with the mobile device may include an inventory as described above. The inventory for the given space may have been established by another user at a previous time. The inventory includes one or more configurable objects, along with the spatial relation of each configurable object within the space. As the user views the unfamiliar space, the inventory is used to generate an overlay of the configurable objects on the view of the space. In this way, the user may become familiar with locations of the various inventoried objects within the space. This allows for location and identification of specific objects that may require maintenance or other service. In a similar application, a user or technician may view a rendering of an inventoried space prior to visiting a site or location. In this way, the technician may become familiar with the layout of a particular location before arrival to save time when visiting the location.

In addition to merely displaying a visual depiction in an overlay, the system may be configured to display to the user additional information relating to the location, or one or more configurable objects within the location. For example, the user may select a particular configurable object and the system may be configured to display an informational inset to the view of the room, which includes information relating to the selected object. For example, part numbers, names, descriptions, and/or maintenance descriptions may be displayed to the user via an AR application in an overlay to the sensed field of view of the location.

Mixed reality (MR) technology may be employed to provide a user interface allowing a user to adapt to different object configurators during runtime. The user can manually rearrange virtual components in order to match a specific configuration of a real-world object.

By mixing elements of AR with MR, changed object configurations may be adapted to make the AR applications more flexible. In addition, AR applications may be reused for specific components. The human ability to recognize objects is used rather than relying on costly vision algorithms. Thus, service technicians may configure existing AR applications during use and do not need to rely on an information technology (IT) specialist in order to build a new AR application on their behalf.

In an embodiment, markers may be used on one or more of the components. This would allow the AR application to identify each component in an object. The use of markers may provide the advantage of correctly identifying components. However, this approach requires the installation of markers on each component, and the markers may not be visible at all times depending on the relative orientation of the real-world object and the mobile device. Moreover, relationships between different components may not be visualized. Overlays for the whole rack or a specific combination of component objects may prove difficult to generate and place in the user's field of view.

Figure 6:
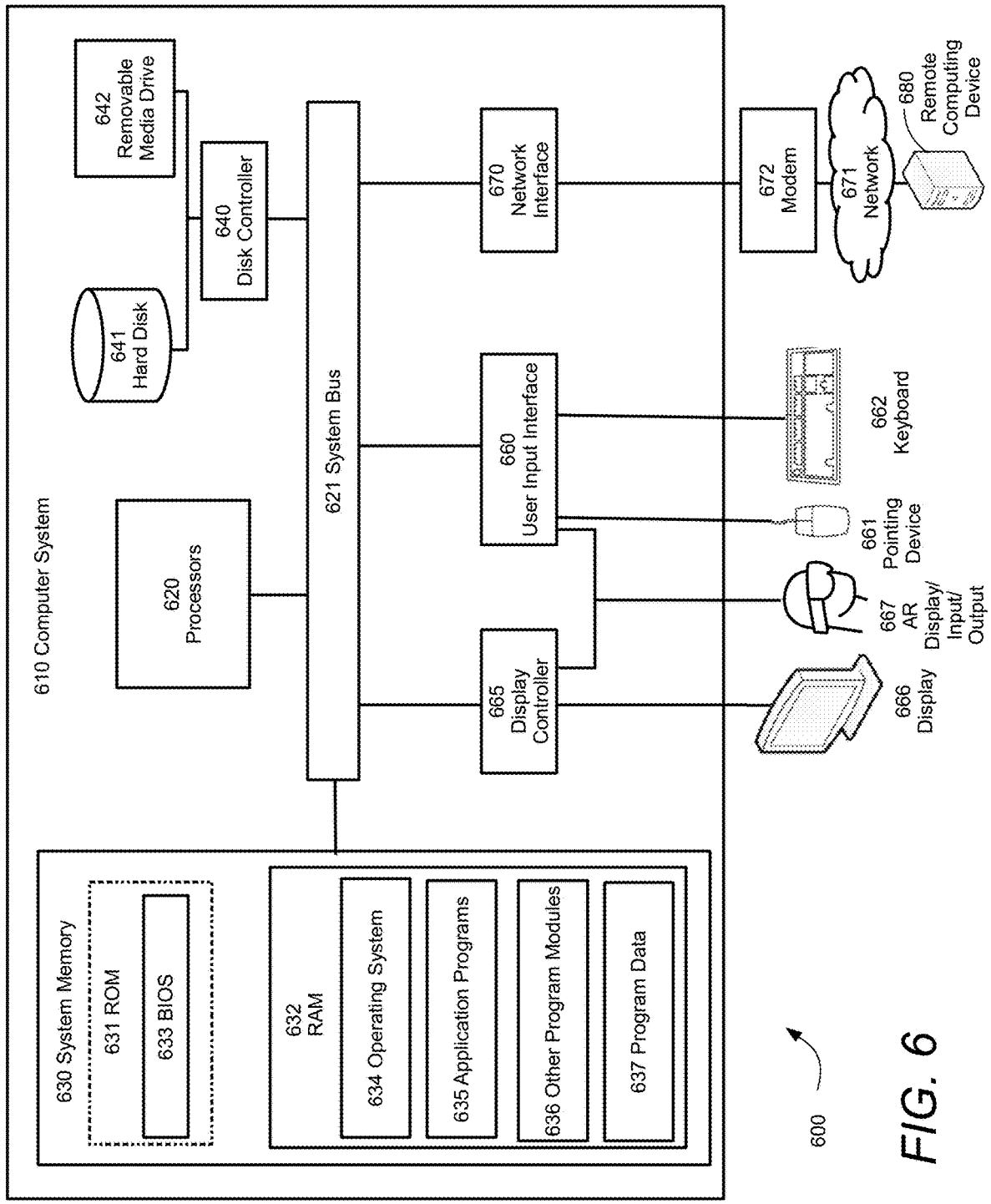
FIG. 6 is a block diagram of a computer system, which may be used to practice aspects according to embodiments of the disclosure.

FIG. 6 illustrates an exemplary computing environment 600 within which embodiments of the invention may be implemented. Computers and computing environments, such as computer system 610 and computing environment 600, are known to those of skill in the art and thus are described briefly here.

Computer system 610 may include a communication mechanism such as a system bus 621 or other communication mechanism for communicating information within the computer system 610. The computer system 610 further includes one or more processors 620 coupled with the system bus 621 for processing the information.

The processors 620 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general-purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 6, the computer system 610 also includes a system memory 630 coupled to the system bus 621 for storing information and instructions to be executed by processors 620. The system memory 630 may include computer readable storage media in the form of volatile and/or nonvolatile memory, such as read only memory (ROM) 631 and/or random access memory (RAM) 632. The RAM 632 may include other dynamic storage device(s) (e.g., dynamic RAM, static RAM, and synchronous DRAM). The ROM 631 may include other static storage device(s) (e.g., programmable ROM, erasable PROM, and electrically erasable PROM). In addition, the system memory 630 may be used for storing temporary variables or other intermediate information during the execution of instructions by the processors 620. A basic input/output system 633 (BIOS) containing the basic routines that help to transfer information between elements within computer system 610, such as during start-up, may be stored in the ROM 631. RAM 632 may contain data and/or program modules that are immediately accessible to and/or presently being operated on by the processors 620. System memory 630 may additionally include, for example, operating system 634, application programs 635, other program modules 636 and program data 637.

The computer system 610 also includes a disk controller 640 coupled to the system bus 621 to control one or more storage devices for storing information and instructions, such as a magnetic hard disk 641 and a removable media drive 642 (e.g., floppy disk drive, compact disc drive, tape drive, and/or solid state drive). Storage devices may be added to the computer system 610 using an appropriate device interface (e.g., a small computer system interface (SCSI), integrated device electronics (IDE), Universal Serial Bus (USB), or FireWire).

The computer system 610 may also include a display controller 665 coupled to the system bus 621 to control a display or monitor 666, such as a cathode ray tube (CRT) or liquid crystal display (LCD), for displaying information to a computer user. The computer system includes an input interface 660 and one or more input devices, such as a keyboard 662 and a pointing device 661, for interacting with a computer user and providing information to the processors 620. The pointing device 661, for example, may be a mouse, a light pen, a trackball, or a pointing stick for communicating direction information and command selections to the processors 620 and for controlling cursor movement on the display 666. The display 666 may provide a touch screen interface which allows input to supplement or replace the communication of direction information and command selections by the pointing device 661. In some embodiments, an augmented reality device 667 that is wearable by a user, may provide input/output functionality allowing a user to interact with both a physical and virtual world. The augmented reality device 667 is in communication with the display controller 665 and the user input interface 660 allowing a user to interact with virtual items generated in the augmented reality device 667 by the display controller 665. The user may also provide gestures that are detected by the augmented reality device 667 and transmitted to the user input interface 660 as input signals.

The computer system 610 may perform a portion or all of the processing steps of embodiments of the invention in response to the processors 620 executing one or more sequences of one or more instructions contained in a memory, such as the system memory 630. Such instructions may be read into the system memory 630 from another computer readable medium, such as a magnetic hard disk 641 or a removable media drive 642. The magnetic hard disk 641 may contain one or more datastores and data files used by embodiments of the present invention. Datastore contents and data files may be encrypted to improve security. The processors 620 may also be employed in a multi-processing arrangement to execute the one or more sequences of instructions contained in system memory 630. In alternative embodiments, hard-wired circuitry may be used in place of or in combination with software instructions. Thus, embodiments are not limited to any specific combination of hardware circuitry and software.

As stated above, the computer system 610 may include at least one computer readable medium or memory for holding instructions programmed according to embodiments of the invention and for containing data structures, tables, records, or other data described herein. The term "computer readable medium" as used herein refers to any medium that participates in providing instructions to the processors 620 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 641 or removable media drive 642. Non-limiting examples of volatile media include dynamic memory, such as system memory 630. Non-limiting examples of transmission media include coaxial cables, copper wire, and fiber optics, including the wires that make up the system bus 621. Transmission media may also take the form of acoustic or light waves, such as those generated during radio wave and infrared data communications.

The computing environment 600 may further include the computer system 610 operating in a networked environment using logical connections to one or more remote computers, such as remote computing device 680. Remote computing device 680 may be a personal computer (laptop or desktop), a mobile device, a server, a router, a network PC, a peer device or other common network node, and typically includes many or all of the elements described above relative to computer system 610. When used in a networking environment, computer system 610 may include modem 672 for establishing communications over a network 671, such as the Internet. Modem 672 may be connected to system bus 621 via user network interface 670, or via another appropriate mechanism.

Network 671 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 610 and other computers (e.g., remote computing device 680). The network 671 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 671.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

What is claimed is:

1. A system for enabling an augmented reality (AR) application comprising:
    a computer processor;
    a mobile device in communication with the computer processor;
    an image sensing device in communication with the mobile device;

a memory in communication with the computer processor, the memory storing instructions executable on a computer, which when executed by the computer processor cause the computer processor to:
  receive an input from a user indicative of a spatial property of a real-world object, wherein the user provides the input by dragging a reconfigurable component object representative of the real-world object to a spatial location in an environment sensed by the user;
  track the real-world object with the AR application based on the user input; and
  display a visual overlay in the user's field of view sensed by the image sensing device containing the real-world object,
  wherein the real-world object is a computer rack having a first configuration and a second configuration, the first configuration of the computer rack defining a first placement of a first plurality of computer components in the computer rack in a first specific order, and the second configuration of the computer rack defining a second placement of a second plurality of computer components in the computer rack in a second specific order that is different than the first specific order.

2. The system of claim 1, wherein the mobile device is a device wearable by the user.

3. The system of claim 1, wherein the mobile device is a tablet computer.

4. The system of claim 1, wherein the input received from the user comprises the user tracing a virtual outline of the real-world object.

5. The system of claim 1, wherein the input received from the user comprises the user selecting a type of real-world object from list containing a plurality of types of real-world objects.

6. The system of claim 1, wherein the real-world object is a computer rack and a first configuration of the computer rack is a placement of a plurality of computer components in the computer rack in a first specific order.

7. The system of claim 1, wherein the real-world object is an inventoried component within a room, and a first configuration is a spatial position of the inventoried component within the room.

8. The system of claim 7, wherein displaying a visual overlay comprises:
  displaying in the mobile device, stored information relating to the inventoried object.

9. A method for displaying information in an augmented reality (AR) application comprising:
  in a computer processor, receiving an input from a user relating to a spatial coordinate within a field of view of the user, wherein the input received from the user is provided by the user dragging a reconfigurable component object representative of a real-world object to the spatial coordinate in the field of view the user;
  in the computer processor, associating the user input with a first configuration of the real-world object; and
  in the AR application, superimposing in a viewable mobile device, augmented reality data over a depiction of the real-world object
  wherein the real-world object is a computer rack having the first configuration and a second configuration, the first configuration of the computer rack defining a first placement of a first plurality of computer components in the computer rack in a first specific order, and the second configuration of the computer rack defining a second placement of a second plurality of computer components in the computer rack in a second specific order that is different than the first specific order.

10. The method of claim 9, wherein the mobile device is a device wearable by the user.

11. The method of claim 9, wherein the mobile device is a tablet computer.

12. The method of claim 9, wherein the input received from the user comprises the user tracing a virtual outline of the real-world object or user environment.

13. The method of claim 9, wherein the input received from the user comprises the user selecting a type of real-world object from list containing a plurality of types of real-world objects.

14. The method of claim 9, wherein displaying a visual overlay comprises:
  displaying in the mobile device, an animated maintenance procedure on one computer component of the first configuration or the second configuration of the computer rack.

15. The method of claim 9, wherein the real-world object is an inventoried component within a room, and the first configuration is a spatial position of the inventoried component within the room.

16. The method of claim 15, wherein displaying a visual overlay comprises: displaying in the mobile device, stored information relating to the inventoried object.

* * * * *